United States Patent [19]

Sampath

[11] Patent Number: 5,424,821
[45] Date of Patent: Jun. 13, 1995

[54] CONTROL OF INTERMINGLED COPY SHEETS HAVING DIFFERENT CHARACTERISTICS IN PAPER PATH

[75] Inventor: Barbara A. Sampath, Fairport, N.Y.

[73] Assignee: Xerox Corporation, Stamford, Conn.

[21] Appl. No.: 208,250

[22] Filed: Mar. 9, 1994

[51] Int. Cl.6 .............................................. G03G 21/00
[52] U.S. Cl. ........................................ 355/311; 271/9; 355/208; 355/316
[58] Field of Search ............... 355/208, 308, 309, 311, 355/316, 317, 321; 271/9, 111, 258, 259

[56] References Cited

U.S. PATENT DOCUMENTS

| | | | |
|---|---|---|---|
| 4,956,651 | 9/1990 | Emori | 355/316 X |
| 5,067,835 | 11/1991 | Yamamoto et al. | 355/311 X |
| 5,130,757 | 7/1992 | Ito | 355/311 |
| 5,221,949 | 6/1993 | Miyamoto | 355/309 |
| 5,247,337 | 9/1993 | Malachowski | 355/308 |
| 5,282,001 | 1/1994 | Watson | 355/208 |
| 5,323,220 | 6/1994 | Yasuda | 355/317 |

Primary Examiner—William J. Royer
Attorney, Agent, or Firm—Ronald F. Chapuran

[57] ABSTRACT

An image processing apparatus for intermingling copy sheets of different characteristics on a copy sheet path including a controller for directing the image processing apparatus, the controller tracking the movement of the copy sheets along the copy sheet path, a sensor for determining the characteristic of each copy sheet at the beginning of the copy sheet path, logic for translating the characteristic of each copy sheet into timing adjustments, and a control element for applying the timing adjustments for each copy sheet along the copy sheet path.

13 Claims, 4 Drawing Sheets

CONTROL OF INTERMINGLED COPY SHEETS HAVING DIFFERENT CHARACTERISTICS IN PAPER PATH

BACKGROUND OF THE INVENTION

The invention relates to copy sheet control and, more particularly, to the capability of mixing copy sheets of different characteristics along the paper path.

If imaging machines are to become more versatile in completing complex jobs, the machine control must be able to adapt to a wide variety of requirements in an efficient manner. Modern business and document needs oftentimes dictate the need for prints or images with a variety of interspersed features. A suitable control must be able to accurately and efficiently schedule the machine for coordinating these various features.

In a complex set of images, many of the images may require individually tailored features to provide an accurate completed set. For example, the process dimension of a sheet may determine whether or not a specific operation or control can be performed on a sheet. That is, it may not be possible to rotate a sheet whose diagonal length exceeds a given size due to hardware limitations. It may not even be possible to intermingle copy sheets if the control is not easily adopted to timing changes.

It is known in the prior art to be able to provide selected documents in a set of documents with different features. For example, U.S. Pat. No. 4,982,234 discloses a user interface screen for programming different features for individual documents or groups of documents in a set of documents in a black and white reproduction machine.

It is also known to be able to recover from a jam condition by selectively controlling images or copy sheets in process. For example, U.S. Pat. No. 4,627,711 to Schron, assigned to Xerox Corporation, discloses a control system for controlling the shutdown of a paper path system in a copy machine when a paper handling fault occurs. Upon detecting a malfunction or jam, the control system evaluates the status of all sheets in a sheet handling system and makes determinations whether to hold sheets from entering into a boundary between two zones or to drive a sheet at a boundary into a next zone.

U.S. Pat. No. 4,231,567 to Ziehm, assigned to Xerox Corporation, discloses a method and apparatus for clearing jams in a transport path of a copier. When a jam is sensed, in-process sheets either at a jam location or at an area upstream of the jam location are clustered while sheets downstream from the jam location are allowed to continue out into a catch tray. The jam sheets are removed manually after the last downstream sheet exists the copier and the copier shuts down.

One difficulty in prior art devices is that the control cannot readily respond to document and copy sheet characteristics such as size, texture, or weight to adjust the machine processing parameters. Another difficulty in prior art devices is that the control cannot readily respond to various document and copy sheet characteristics such as size, texture, or weight within a single document set to set hardware and control parameters to produce a completed set.

It is an object, therefore, of the present invention to provide a new and improved system for tracking individual documents or copy sheets of variable characteristics such as size, texture, and weight throughout the copy sheet flow process. Another object of the present invention is to be able to selectively adjust machine timing and hardware responses in order to selectively apply different parameters to individual copy sheets in a document set. Other advantages of the present invention will become apparent as the following description proceeds, and the features characterizing the invention will be pointed out with particularity in the claims annexed to and forming a part of this specification.

SUMMARY OF THE INVENTION

An image processing apparatus for intermingling copy sheets of different characteristics on a copy sheet path including a controller for directing the image processing apparatus, the controller tracking the movement of the copy sheets along the copy sheet path, a sensor for determining the characteristic of each copy sheet at the beginning of the copy sheet path, logic for translating the characteristic of each copy sheet into timing adjustments, and a control element for applying the timing adjustments for each copy sheet along the copy sheet path.

For a better understanding of the present invention, reference may be had to the accompanying drawings wherein the same reference numerals have been applied to like parts and wherein:

DETAILED DESCRIPTION OF THE DRAWINGS

DETAILED DESCRIPTION OF THE PREFERRED EMBODIMENT

Figure 1:
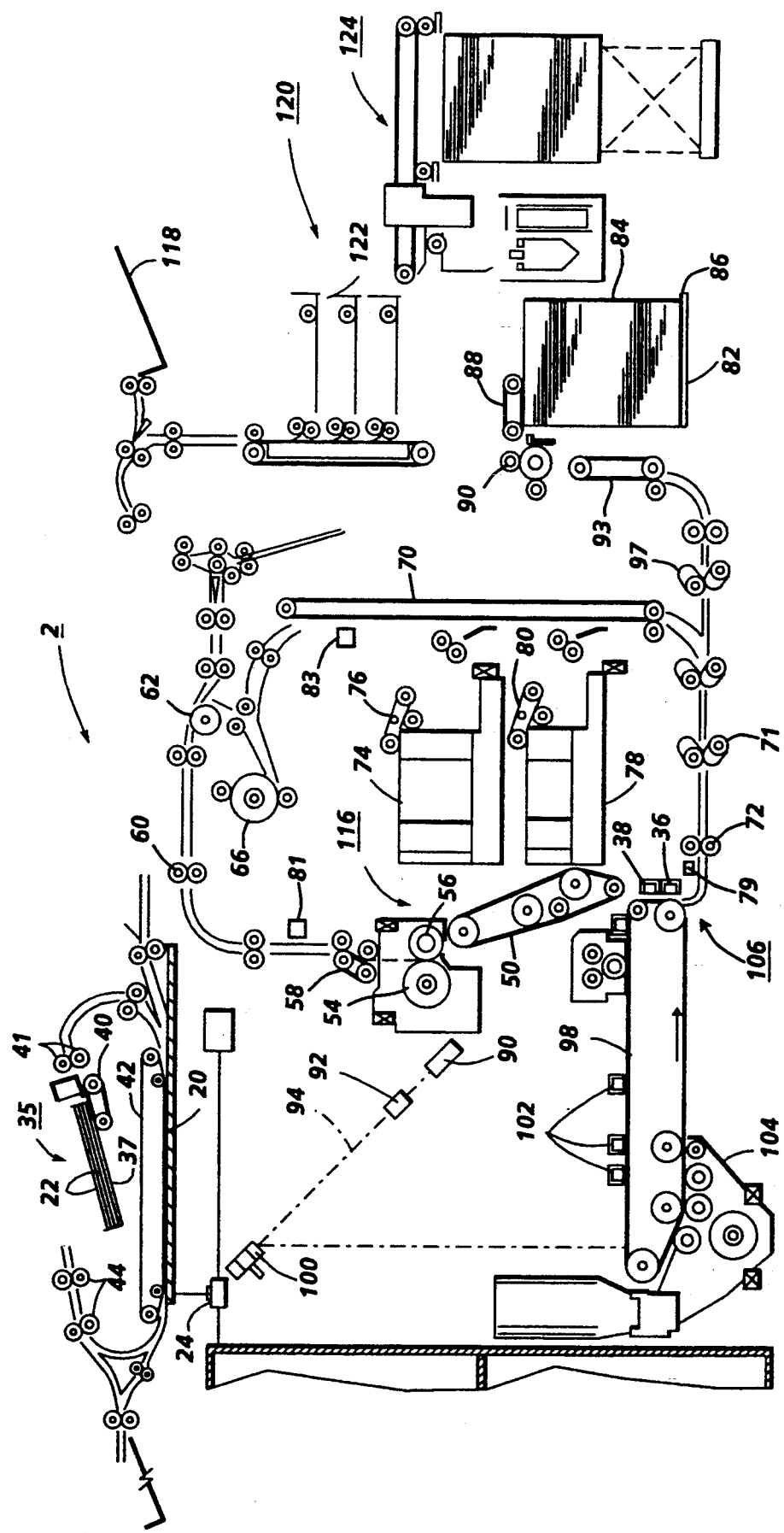
FIG. 1 is a plan view illustrating the principal mechanical components of a typical printing system incorporating the present invention.
Figure 2:
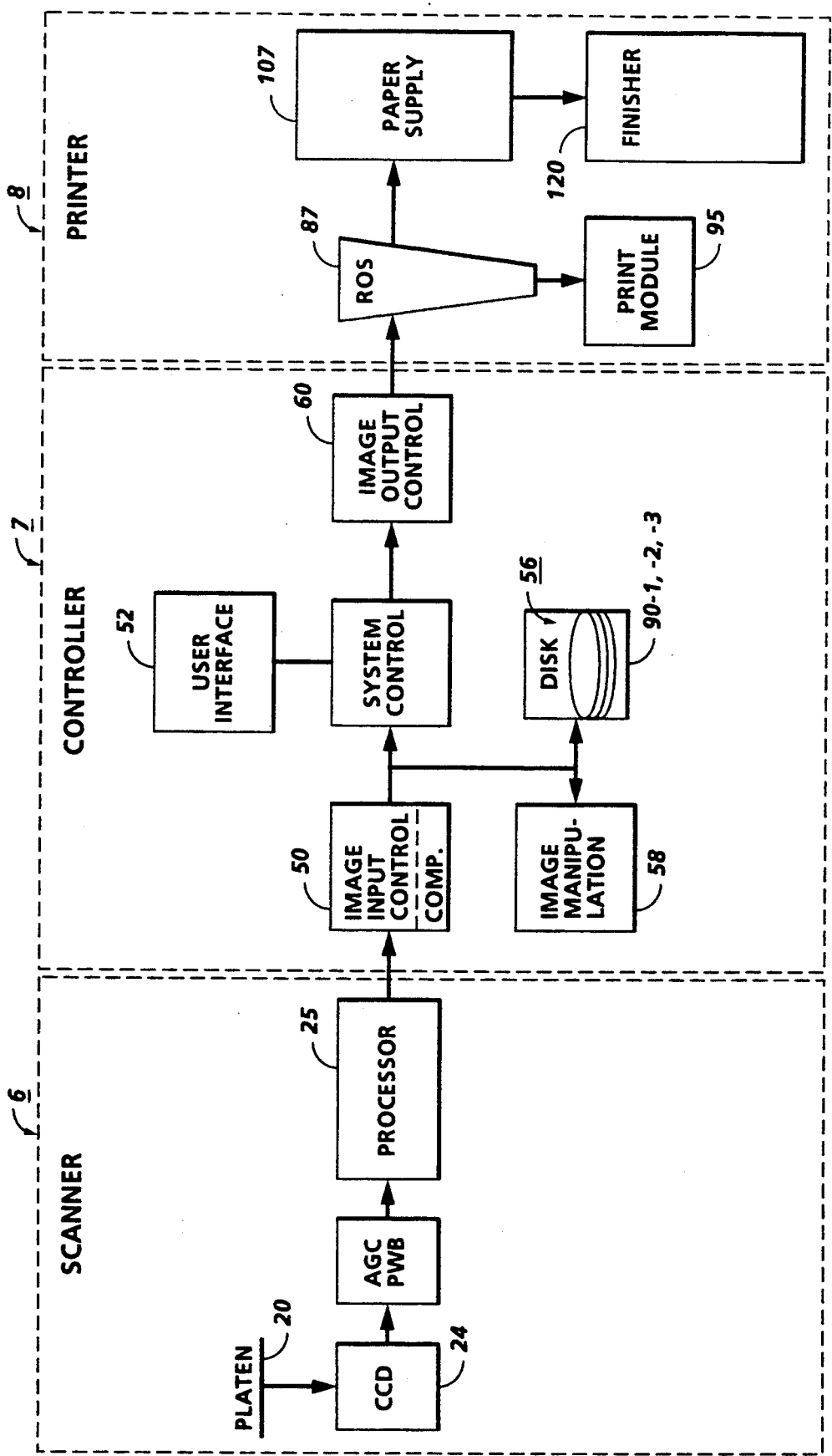
FIG. 2 is a block diagram depicting the major control elements of the printing system shown in FIG. 1.

Referring to FIGS. 1 and 2, there is shown an exemplary laser based printing system 2 for processing print jobs in accordance with the teachings of the present invention. Printing system 2 for purposes of explanation is divided into a scanner section 6, controller section 7, and printer section 8. While a specific printing system is shown and described, the present invention may be used with other types of printing systems such as ink jet, ionographic, etc.

Scanner section 6 incorporates a transparent platen 20 on which a document to be scanned is located. One or more linear arrays 24 are supported for reciprocating scanning movement below platen 20. Suitable lens and mirrors cooperate to focus array 24 on a line-like segment of platen 20 and the document being scanned thereon. Array 24 provides image signals or pixels representative of the image scanned which after suitable processing by processor 25, are output to controller section 7.

Processor 25 converts the analog image signals output by array 24 to digital and processes the image signals as required to enable system 2 to store and handle the image data in the form required to carry out the job programmed. Processor 25, for example, may provide enhancements and changes to the image signals such as filtering, thresholding, screening, cropping, etc.

Documents 22 to be scanned may be located on platen 20 for scanning by automatic document handler (ADF) 35 operable in either a Recirculating Document Handling (RDH) mode or a Semi-Automatic Document Handling (SADH) mode. A manual mode including a Book mode and a Computer Forms Feeder (CFF) mode are also provided, the latter to accommodate documents in the form of computer fanfold. For RDH mode operation, document handler 35 has a document tray 37 in which documents 22 are arranged in stacks or batches. The documents 22 in tray 37 are advanced by vacuum feed belt 40 and document feed rolls 41 and document feed belt 42 onto platen 20 where the document is scanned by array 24. Following scanning, the document is removed from platen 20 by belt 42 and returned to tray 37 by document feed rolls 44.

Printer section 8 comprises a laser type printer and for purposes of explanation is separated into a Raster Output Scanner (ROS) section 87, Print Module Section 95, Paper Supply section 107, and Finisher 120. ROS 87 has a laser 90, the beam of which is split into two imaging beams 94. Each beam 94 is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan and create the latent electrostatic images represented by the image signal input to modulator 92. Photoreceptor 98 is uniformly charged by corotrons 102 at a charging station preparatory to exposure by imaging beams 94. The latent electrostatic images are developed by developer 104 and transferred at transfer station 106 to print media delivered by Paper Supply section 107. The print media may comprise any of a variety of sheet sizes, types, and colors. For transfer, the print media is brought forward in timed registration with the developed image on photoreceptor 98 from either a main paper tray 84 or from auxiliary paper trays 74 or 78. The developed image transferred to the print media is permanently fixed or fused by fuser 116 and the resulting prints discharged to either output tray 118, or to finisher 120. Finisher 120 includes a stitcher 122 for stitching or stapling the prints together to form books and a thermal binder 124 for adhesively binding the prints into books.

A copy sheet is provided via de-skew rollers 71 and copy sheet feed rollers 72. Sensor 79 detects the absence or presence of a copy sheet leaving rollers 72. At the transfer station 106, the photoconductive belt 98 is exposed to a pre-transfer light from a lamp (not shown) to reduce the attraction between photoconductive belt and the toner powder image. Next, a corona generating device 36 charges the copy sheet to the proper magnitude and polarity so that the copy sheet is tacked to the photoconductive belt and the toner powder image is attracted from the photoconductive belt to the copy sheet. After transfer, corona generator 38 charges the copy sheet to the opposite polarity to detach the copy sheet from belt.

Following transfer, a conveyor 50 advances the copy sheet bearing the transferred image to the fuser 116 permanently affixing the toner powder image to the copy sheet. Preferably, fuser 116 includes a heated fuser roller 54 and a pressure roller 56 with the powder image on the copy sheet contacting fuser roller 54.

After fusing, the copy sheets are fed through a decurler 58 to remove any curl. Sensor 81 detects the absence or presence of a copy sheet leaving fuser 116. Forwarding rollers 60 then advance the sheet via duplex turn roll 62 to a gate which guides the sheet to output tray 118, finishing station 120 or to duplex inverter 66. The duplex inverter 66 provides a temporary wait station for each sheet that has been printed on one side and on which an image will be subsequently printed on tile opposite side. Each sheet is held in the duplex inverter 66 face down until feed time occurs.

To complete duplex copying, the simplex sheet in the inverter 66 is fed back to the transfer station 106 via conveyor 70, de-skew rollers 71 and paper feed rollers 72 for transfer of the second toner powder image to the opposed sides of the copy sheets. Sensor 83 detects the absence or presence of a copy sheet leaving inverter 66. It should be noted that various other suitable sensors distributed throughout the copy sheet path to detect appropriate copy sheet distribution are contemplated within the scope of the present invention and sensors 79, 81, and 83 are merely illustrative. The duplex sheet is then fed through the same path as the simplex sheet to be advanced to the finishing station which includes a stitcher and a thermal binder.

Copy sheets are supplied from the secondary tray 74 by sheet feeder 76 or from secondary tray 78 by sheet feeder 80. Sheet feeders 76, 80 are friction retard feeders utilizing a feed belt and take-away rolls to advance successive copy sheets to transport 70 which advances the sheets to rolls 72 and then to the transfer station.

A high capacity feeder 82 is the primary source of copy sheets. Tray 84 of feeder 82 is supported on an elevator 86 for up and down movement and has a vacuum feed belt 88 to feed successive uppermost sheets from the stack of sheets in tray 84 to a take away drive roll 90. Roll 90 guides the sheet onto transport 93 which in cooperation with paper feed rollers 97 move the sheet to the transfer station via de-skew rollers 71 and feed rollers 72.

Controller section 7 is, for explanation purposes, divided into an image input controller 50, User Interface (UI) 52, system controller 54, main memory 56, image manipulation section 58 and image output controller 60. The scanned image data input from processor 25 of scanner section 6 to controller section 7 is compressed by an image compressor/processor. The image files, which represent different print jobs, are temporarily stored in a system memory which comprises a Random Access Memory or RAM pending transfer to main memory 56 where the data is held pending use.

UI 52 includes a combined operator controller/CRT display consisting of an interactive touchscreen, a keyboard, and a mouse. UI 52 interfaces the operator with printing system 2, enabling the operator to program print jobs and other instructions, to obtain system operating information, instructions, programming information, diagnostic information, etc. Main memory 56 has plural hard disks 90-1, 90-2, 90-3 for storing machine Operating System software, machine operating data, and the scanned image data currently being processed.

When the compressed image data in main memory 56 requires further processing, or is required for display on the touchscreen of UI 52, or is required by printer section 8, the data is accessed in main memory 56. Where further processing other than that provided by processor 25 is required, the data is transferred to image manipulation section 58 where the additional processing steps such as collation, make ready, decomposition, etc. are carried out. Following processing, the data may be returned to main memory 56, sent to UI 52 for display on the touchscreen or sent to image output controller 60.

Figure 3:
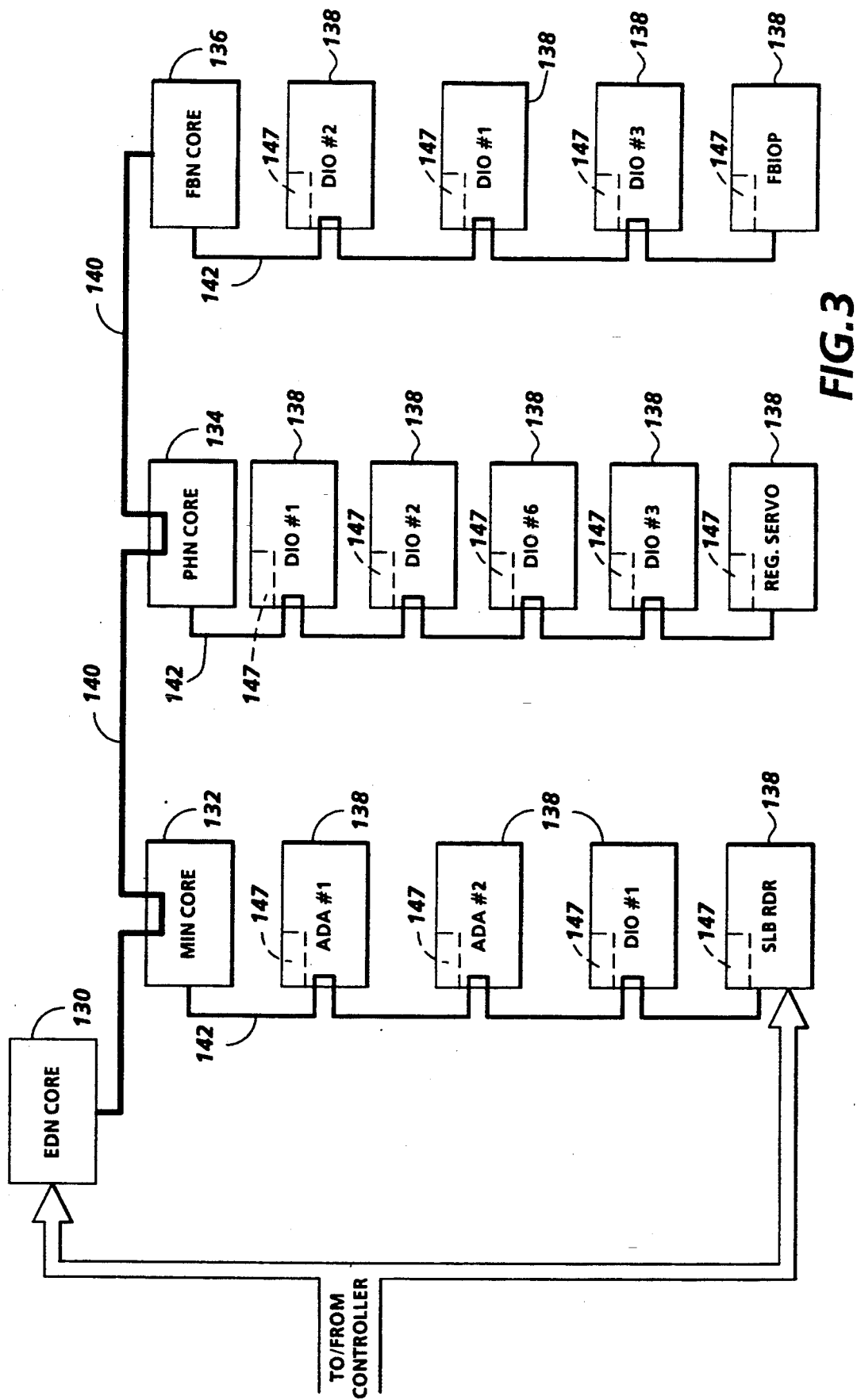
FIG. 3 is a block diagram depicting the printed wiring boards and shared line connections of the operating system of the control of FIG. 2.

Referring particularly to FIG. 3, system control signals are distributed via a plurality of printed wiring boards (PWBs). These include EDN core PWB 130, Marking Imaging core PWB 132, Paper Handling core PWB 134, and Finisher Binder core PWB 136 together with various Input/Output (I/O) PWBs 138. A system bus 140 couples the core PWBs 130, 132, 134, 136 with each other and with controller section 7 while local buses 142 serve to couple the I/O PWBs 138 with each other and with their associated core PWB.

On machine power up, the Operating System software is loaded from memory 56 to EDN core PWB 130 and from there to the remaining core PWBs 132, 134, 136 via bus 140, each core PWB 130, 132, 134, 136 having a boot ROM 147 for controlling downloading of Operating System software to the PWB, fault detection, etc. Boot ROMs 147 also enable transmission of Operating System software and control data to and from PWBs 130, 132, 134, 136 via bus 140 and control data to and from I/O PWBs 138 via local buses 142. Additional ROM, RAM, and NVM memory types are resident at various locations within system 2.

Very often, control requirements require that trail edge jam times be calculated for each sensor based on the process dimension of the sheet. Different trail edge jam times are also often required for sensors in different transports because the process speed of the sheet is different in each of the transports. In addition, trail edge jam times for a rotated sheet are different than the jam time for a non-rotated sheet because the process dimension will be different.

A possible solution to the Control Requirement is the use of an information byte. A sheet information byte is two bytes of software information that is passed through the base software along with each sheet. The information byte is a "personality profile" of each sheet, giving detail such as: feeder source, sheet destination, tab sheet, rotate sheet, transparency sheet, end of job (or set) sheet, offset sheet, purge sheet, nine-inch sheet, fuser clean-up sheet, output function sheet, and inverted sheet. However, due to real time constraints, and resource limitations, it is usually not possible to pass the sheet dimension information along with the sheet. In accordance with the present invention, a method was found to obtain the information and make it usable on an individual sheet basis.

Tray size information is determined whenever the machine is powered up and thereafter whenever the size of the paper loaded into the tray changes. The control takes each pair of dimensions length and width and performs all necessary calculations on them as received, storing the data in arrays indexed by the Source (tray) number. For example, if Tray 4 holds 11"×17" sheets, a typical calculation for its Trail Edge jam check over a first sensor is:

1.03×Sheet Process dimension (mm)+60 ms=(1.03×433)+60 ms=506 (milliseconds).

After the calculation is performed, the data (506 ms) is stored in a Trail Edge Jam Check Array Index. The Array Index used is 4, for the fourth source tray. The same trail edge jam check can be different over a different sensor because the speed of the transport may change or the paper speed may be affected by a speed-up servo.

Another typical calculation, for example, is to determine if this sheet can be rotated or not. This calculation references is the diagonal size of the sheet, and is compared to a constant for the largest size sheet to be rotated. A TRUE or FALSE is inserted in a Rotate Array Index (again, the array index used is 4, the same designation as for source tray 4.) The calculation of: $D = w2 + L2$, for 11"×17" paper is:

$433^2 + 280^2 = 265,998$ and, therefore, exceeds the limit of 202,500, and these sheets cannot be rotated, and a False is placed in the array index rotate[4].

When all the tray sizes have been sent down and all the calculations done, the rotate array may look something like this: Rotate[1]True, Rotate[2]True, Rotate[3]True, Rotate[4]False, assuming sources are designated as: Tray 1:1, Tray 2:2, Tray 3:3 Tray 4:4

In other words any sheets from trays 1, 2, 3 but not tray 4 can be rotated using this information in real time. The sheet information byte for each sheet is interrupted as it is received and matched. That information is matched with what was previously calculated for the tray delivery.

For example, during a production or job run a sheet information byte for example, from source tray 4 is matched with the Rotate [source tray 4] to determine if this particular sheet can be rotated. In this example, the sheet source tray is 4 and the Rotate [source tray 4] is FALSE, and the sheet will not be rotated.

The benefits of using the above method include: allowing implementation of algorithms using paper dimensions and applying these to individual sheets for the purpose of controlling that sheet, increasing processing speed, vital to real time control systems, and efficient use of resources.

Additional uses relate to other data obtained about tray contents.

For example, if knowledge is received that the source tray contains certain stock such as hole punched paper, further control can be performed based on source tray attributes.

Determining the trail edge of the paper can be applied and is important when the trailing edge of a sheet is used for control such as in the inverter where accuracy of determination is critical. A calculation to determine the nominal trailing edge of a sheet based on source tray is performed when the tray sizes are changed and at initial state. When the leading edge of the sheet is detected at the sensor, a blockout time slightly less than the calculated "nominal time" is used, and only after that expires does the software look for the trailing edge of the sheet. With this method multiple holes will not be detected as false trailing edges. The software only looks the last few millimeters of the sheet where a hole would not occur.

Figure 4:
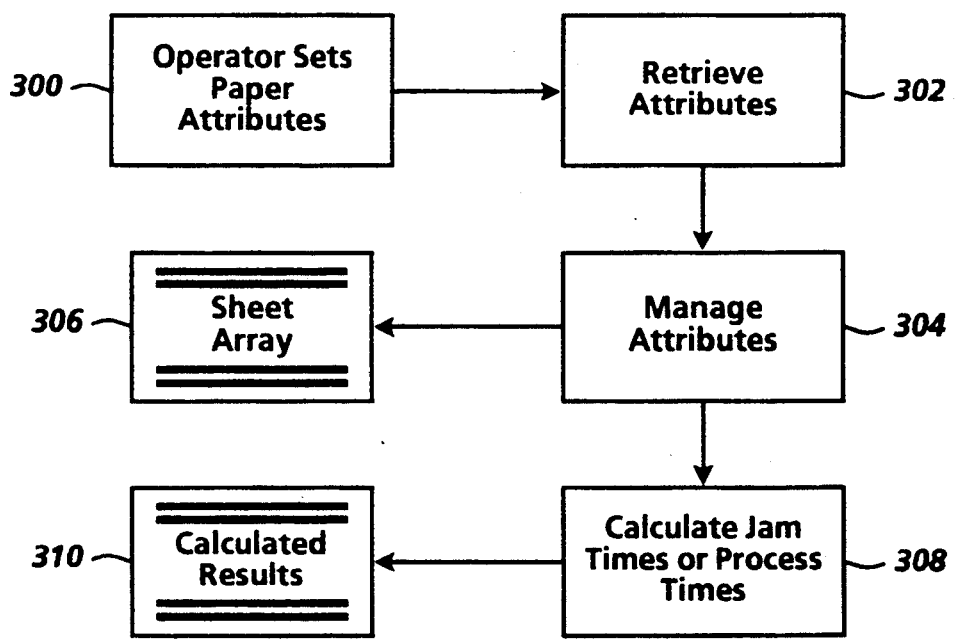
FIGS. 4 and 5 are general flow charts of the feature of scheduling copy sheets of different characteristics along the paper path in accordance with the present invention.

With reference to FIG. 4 in accordance with the present invention, block 300 illustrates the operator setting paper attributes. This can be accomplished by the operator setting a particular tray to hold a specific size copy sheet and sensors attached to the tray communicating the setting for paper size to the system control. Another option is merely for the operator at the user interface to enter various copy sheet attributes such as size and type for each of a set of given trays. Another option for determining copy sheet attributes such as size is for suitably positioned sensors at the copy sheet feed trays to sense the size of the copy sheets as sheets are fed onto a conveyor or transport.

Block 302 illustrates the retrieval of the attributes into a copy sheet attribute profile processor suitably located in the system control 54. The attributes can be generally retrieved by the profile processor on machine power up. It should be noted that the profile processor records and organizes paper attributes for a plurality of copy sheet sources. At block 304, the profile processor attributes such as sheet size are stored or located in a suitable memory location as illustrated by the sheet size array 306. Also for each copy sheet source, the profile processor calculates various jam times or process times as illustrated at block 308 and suitably stores the appropriate time periods in a suitable result store as shown at 310. It should be noted that each size or type of copy sheet may require several jam time periods for various sensors located throughout the machine along the paper path related to various transport characteristics and speed times required throughout the imaging process. Also as paper sizes are changed in any of the sources at any time, there is an update of the various jam and process times to relate to the changed paper size.

Figure 5:
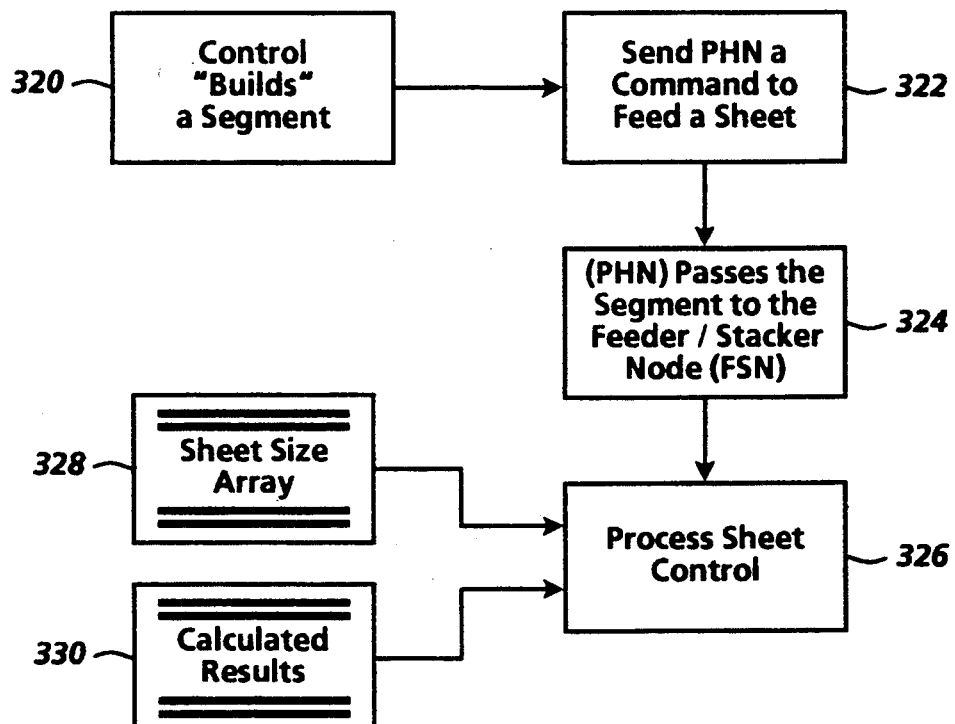

With reference to FIG. 5, an operation in accordance with the present invention, the system proceeds as follows. An output control builds a segment for each sheet as illustrated in block 320. By this is meant that a sheet is tagged with known processing information such as the copy sheet or feeder source. The output processor often known as the IOT manager then sends the segment or information source to a control known as the paper handling node (PHN). The same information is also sent to a feeder stacker node (FSN). This is illustrated in blocks 322 and 324. In a specific embodiment, the PHN node controls feeders 1 and 2 and the feeder stacker node controls feeders 3 and 4. Based upon the information received from the IOT manager, one of the PHN or FSN nodes feeds a copy sheet from a selected feeder. Internally, the segment or attached known information such as copy sheet source accompanies the sheet as it travels the copy sheet or paper path. As the sheet traverses the copy sheet path, a process sheet control illustrated at block 326 matches the previously stored calculated results and feeder attribute information to monitor the sheet travel. For example the sheet size information that is stored in memory as illustrated at block 328 and the various processing and jam time calculations as illustrated at block 330 are monitored to determine the expected processing jam periods and processing periods as well as various operations dependent upon such things as copy sheet size.

While there has been illustrated and described what is at present considered to be a preferred embodiment of the present invention, it will be appreciated that numerous changes and modifications are likely to occur to those skilled in the art, and it is intended to cover in the appended claims all those changes and modifications which fall within the true spirit and scope of the present invention.

I claim:

1. In an image processing apparatus for producing images on copy sheets, the apparatus including a copy sheet path and a controller for directing the image processing apparatus, the controller tracking the movement of the copy sheets along the copy sheet path, a method of intermingling along the copy sheet path copy sheets having different characteristics comprising the steps of:

determining the characteristic of each copy sheet at the beginning of the copy sheet path;

translating the characteristic of each copy sheet into timing adjustments; and applying the timing adjustments for each copy sheet along the copy sheet path whereby intermingled copy sheets of different characteristics are processed by the image processing apparatus.

2. The method of claim 1 wherein the different characteristics are different copy sheet sizes.

3. The method of claim 1 wherein the different characteristics are different copy sheet weights.

4. The method of claim 1 wherein the different characteristics are different copy sheet textures.

5. The method of claim 4 including the step of determining a copy sheet to be a transparency sheet.

6. The method of claim 1 including a plurality of sources of said copy sheets and wherein the step of determining the characteristic of each copy sheet includes the step of identifying the source of each copy sheet.

7. The method of claim 1 wherein the step of translating the characteristic of each copy sheet into timing adjustments includes the step of setting the time period relative to sensors for determining jam conditions.

8. The method of claim 1 wherein the step of translating the characteristic of each copy sheet into timing adjustments includes the step of setting registration timing.

9. An image processing apparatus for producing images on copy sheets the apparatus including a copy sheet path, a controller for directing the image processing apparatus, the controller tracking the movement of the copy sheets along the copy sheet path, a sensor for determining the characteristic of each copy sheet at the beginning of the copy sheet path; logic for translating the characteristic of each copy sheet into timing adjustments; and means for applying the timing adjustments for each copy sheet along the copy sheet path whereby intermingled copy sheets of different characteristics are processed by the image processing apparatus.

10. The apparatus of claim 9 including a plurality of sources of said copy sheets and means for identifying the source of each copy sheet.

11. The apparatus of claim 9 wherein the logic for translating the characteristic of each copy sheet into timing adjustments includes means for setting the time period relative to sensors for determining jam conditions.

12. In an image processing apparatus for producing images on copy sheets, the apparatus including a copy sheet path and a controller for directing the image processing apparatus, the controller tracking the movement of the copy sheets along the copy sheet path, a method of intermingling along the copy sheet path copy sheets having different characteristics comprising the steps of:

determining the characteristic of each copy sheet at the beginning of the copy sheet path;

translating the characteristic of each copy sheet into timing adjustments including setting the time period relative to sensors for determining jam conditions, and applying the timing adjustments for each copy sheet along the copy sheet path whereby intermingled copy sheets of different characteristics are processed by the image processing apparatus.

13. In an image processing apparatus for producing images on copy sheets, the apparatus including a plurality of sources of copy sheets, a copy sheet path and a controller for directing the image processing apparatus, the controller tracking the movement of the copy sheets along the copy sheet path, a method of intermingling along the copy sheet path copy sheets having different characteristics comprising the steps of:

determining the characteristic of each copy sheet at the beginning of the copy sheet path by determining the source of the copy sheet;

translating the characteristic of each copy sheet into timing adjustments including setting the time period relative to sensors for determining jam conditions, and applying the timing adjustments for each copy sheet along the copy sheet path whereby intermingled copy sheets of different characteristics are processed by the image processing apparatus.

* * * * *